United States Patent [19]

Mautino

[11] Patent Number: 5,156,505
[45] Date of Patent: Oct. 20, 1992

[54] WELDABLE CAST INSERT FOR SHIPPING CONTAINER PEDESTAL

[75] Inventor: Peter S. Mautino, Verona, Pa.

[73] Assignee: McConway & Torley Corporation, Pittsburgh, Pa.

[21] Appl. No.: 662,621

[22] Filed: Feb. 27, 1991

[51] Int. Cl.$^5$ .............................................. B65D 19/00
[52] U.S. Cl. .......................................... 410/71; 410/72
[58] Field of Search ...................... 410/72, 73, 77, 82, 410/83, 84, 90, 91, 44, 52, 54, 68, 71, 70

[56] References Cited

U.S. PATENT DOCUMENTS

| | | | |
|---|---|---|---|
| 3,321,162 | 5/1967 | Connerat | 410/73 |
| 3,547,048 | 12/1970 | Miller | 410/73 |
| 3,556,449 | 1/1971 | Connerat et al. | 410/73 |
| 3,805,709 | 4/1974 | Schuller et al. | 410/73 X |
| 4,131,071 | 12/1978 | Glassmeyer | 410/83 X |
| 4,236,853 | 12/1980 | Niggemeier | 410/76 |
| 4,430,032 | 2/1984 | Morgan | 410/68 |
| 4,597,701 | 7/1986 | DeWitt | 410/77 |
| 4,758,123 | 7/1988 | Corompt | 410/83 X |
| 4,826,371 | 5/1989 | Brown | 410/72 X |
| 4,844,672 | 7/1989 | Yurgevich | 410/54 |

*Primary Examiner*—Frank E. Werner
*Assistant Examiner*—James Eller
*Attorney, Agent, or Firm*—James Ray & Associates

[57] ABSTRACT

The present invention provides a weldable cast insert that enables a particular style locking mechanism to be used in securing a container to a support pedestal on a transportation vehicle. Such cast insert includes a plate-like portion having at least one lug-like portion extending outwardly from an outer edge of the plate-like portion and at least one leg-like portion which depends from a first surface of the plate-like portion at least one aperture having a predetermined configuration is formed through a predetermined portion of the plate-like portion and at least one cut-out portion and such at least one leg portion adjacent a predetermined surface thereof.

20 Claims, 3 Drawing Sheets

WELDABLE CAST INSERT FOR SHIPPING CONTAINER PEDESTAL

FIELD OF THE INVENTION

The present invention relates, in general, to the supporting and connecting of cargo shipping containers on and to, respectively, flat bottom type transportation vehicles, such as railway cars, using a pedestal-type support and, more particularly, the present invention relates to a weldable cast insert engageable with and securable in a cavity formed in a box-like member disposed at one end of a support pedestal which can be pivotally connected to a predetermined portion of such flat bottom type transportation vehicle so that such support pedestal can be readily adapted for use with a predetermined style container locking mechanism used to connect such shipping container to such pedestals.

BACKGROUND OF THE INVENTION

Prior to the present invention, cargo shipping containers have been supported on and connected to railway type flat cars, flat bed trucks or other lading type transport vehicles. The devices normally used as supports for these shipping containers consisted of pedestals which were manually adjustable along the length of the deck portion of the transport vehicle to be used. The adjustment required normally will depend upon the length of the container to be supported.

However, because the locking mechanisms used to secure such shipping container to such support pedestal are supplied by different manufacturers, these pedestals will not work with each style locking mechanism presently available for use in this application in the transportation industry. Such pedestals normally support the shipping container adjacent its corners, however, where specific operating conditions are encountered in which additional support is required, such pedestals have been used to support the shipping containers intermediate the ends thereof as well as at the corners.

As is generally well known in the art, these shipping containers can be of various forms and lengths. If, for example, such shipping containers are to be used at sea, then they may require a special shape.

Further, the flat cars used for transporting the shipping containers on land have, in most cases, been adapted to carry more than one such shipping container. In some instances, for example, such shipping containers are even stacked two high on the cars. This is particularly the case in the railway industry where rail cars have been specifically designed for use in this particular application.

Examples of pedestal type shipping container locking devices and supports are taught in U.S. Pat. Nos. 4,430,032; 4,597,701 and 4,844,672.

Taught in U.S. Pat. No. 4,430,032 is a shipping container retaining apparatus designed for a transporting vehicle having a flat deck. This particular retaining apparatus requires that the shipping container have a corner fitting disposed on at least each of the four corners thereof. Additionally, these corner fittings are required to be in substantially the same horizontal plane. These corner fittings include a slot-like portion which receives a latch lever therein for locking the shipping container to the deck portion of such transport vehicle. A separate support pedestal is provided which releasably supports each corner of the shipping container. Such support pedestal includes a frame having a base, a platform spaced above the base, and end and sidewalls extending vertically of such platform and conforming to a corner fitting as the shipping container is lowered onto the platform. One of the sidewalls includes a slot-like portion formed therein which extends vertically therealong. A latch lever extends along the slot-like portion between parallel walls forming such slot-like portion. A variable pivot for the latch lever is provided. Such variable pivot enables pivoting such latch lever between parallel walls of the slot-like portion so that the latch lever can move into the slot-like portion and into latching engagement with an associated corner fitting on such shipping container. The latch lever has an inwardly extending upper end portion. Such upper end portion has an upwardly facing strike surface and a lower end portion of such latch lever extends a substantial distance beneath the platform. A compression spring engages the lower end portion of the latching lever to bias such latching lever to engage the strike surface with a corner fitting as a shipping container is lowered onto the platform. Such compression spring has a movable seat member disposed adjacent the lower end of the latching lever and a saddle member disposed on the end opposite the movable seat member. Such saddle member being adjacent the lower end portion of such latch lever. A stationary seat member is provided for at the outer end of such compression spring. The saddle member is positioned for bearing engagement with the lower end portion of &:he latching lever. The movable seat member for the compression spring includes a leg portion which extends along the compression spring for a portion of the length thereof and a lock bar member engageable with such leg portion which reacts against the movable seat member and an adjacent wall defining a slot. This prevents compression of the spring and thereby securely locks the latch lever from accidently moving to an undesired release position during service.

A fastener for engagement with a corner casting of a shipping container to secure such shipping container to a flat support of a transport vehicle is taught in U.S. Pat. No. 4,597,701. As taught therein, such corner casting is hollow and has a planar surface abutting and parallel to such flat support of the transport vehicle. Such fastener includes a hook member adapted to penetrate an aperture defined through the planar surface and a pivot means coupling the hook member to such flat support. Such pivot means is movable parallel to the planar surface relative to the flat support thereby enabling movement of the hook member from a first position outside the corner casting disposed on such shipping container to a second position of penetration of the corner casting. In this manner, restraining a wall of such corner casting between the hook member and flat support is achieved. Such pivot means maintains a constant spacial interval from a pivot point to the planar surface during all positions of penetration of the hook member into such aperture. In this manner, during operation, the movable pivot allows the point of attack of the hook member penetrating into the aperture to be varied to match the position and orientation of the aperture. Such penetration of the aperture by the hook member is accomplished without towards and away movement of such pivot point from such planar surface.

U.S. Pat. No. 4,844,672 teaches a wide body shipping container adapted for engagement with standard width shipping container supports mounted on various types of vehicle carriers by providing a plurality of adapters moveably mounted with respect to supporting points on the bottom of the wide body containers. Each such adapter is movable to a position below the shipping container supporting point and engageable therewith in a manner that defines a new supporting structure. Such new supporting structure is spaced laterally inward from the outer most surface of the wide body shipping container so as to permit coupling of the container to a standard width container support.

SUMMARY OF THE INVENTION

The present invention provides a weldable cast insert which is engageable with and securable in a cavity formed in a box-like member. Such box-like member is disposed at one end of a shipping container support pedestal which is pivotally connectable to a flat bottom type transportation vehicle. Such cast insert enables a predetermined style locking mechanism to be used in securing a cargo shipping container to such support pedestal. The weldable cast insert comprises a substantially flat and generally rectangular plate-like portion. Such plate-like portion having each of a predetermined width, a predetermined length, a predetermined thickness, axially-opposed surfaces and a pair of axially-opposed outer edges. There is at least one lug-like portion extending outwardly a predetermined distance from a predetermined outer edge of a first of such pair of axially-opposed edges of such plate-like portion. This at least one lug-like portion is positioned intermediate each end of such first of such pair of axially-opposed outer edges. Such at least one lug-like portion is engageable with a slot-like portion formed adjacent an outer edge of at least one wall portion of a pair of axially-opposed wall portions of such cavity formed in the box-like member. The at least one lug-like portion provides enhanced securement capability of the cast insert to the box-like member. At least one leg portion is provided which depends from a first predetermined surface of such axially-opposed surfaces of the plate-like portion. Such at least one leg portion extends from the first predetermined surface for a predetermined length and such at least one leg portion has a predetermined configuration. At least one aperture having a predetermined configuration is formed through a predetermined portion of such plate-like portion. The final essential element of the weldable cast insert is at least one cut-out portion formed in such at least one leg portion adjacent a predetermined surface thereof. Such at least one cut-out portion is substantially in axial alignment with such at least one aperture. The at least one cut-out portion having a predetermined configuration.

OBJECTS OF THE INVENTION

It is, therefore, one of the primary objects of the present invention to provide a weldable cast insert for a support pedestal used for supporting and connecting a shipping container on and to a transportation vehicle which enables such support pedestal to be used with a particular style locking device that is presently being used in this application.

Another object of the present invention is to provide a weldable cast insert for a support pedestal used for supporting and connecting a shipping container on and to a transportation vehicle which can be formed as a single piece casting.

A further object of the present invention is to provide a weldable cast insert for a support pedestal used for supporting and connecting a shipping container on and to a transportation vehicle that requires a minimum amount of machining.

An additional object of the present invention is to provide a weldable cast insert for a support pedestal used for supporting and connecting a shipping container on and to a transportation vehicle which is relatively inexpensive to manufacture.

It is still yet another object of the present invention, to provide a weldable cast insert for a support pedestal used for supporting and connecting a shipping container on and to a transportation vehicle which, during normal operations, will require a minimum of maintenance.

Still another object of the present invention is to provide a weldable cast insert for a support pedestal used for supporting and connecting a shipping container on and to a transportation vehicle which is relatively lightweight.

A still further object of the present invention, is to provide a weldable cast insert for a support pedestal used for supporting and connecting a shipping container on and to a transportation vehicle having a substantial weld area.

Yet still another object of the present invention, is to provide a weldable cast insert for a support pedestal used for supporting and connecting a shipping container on and to a transportation vehicle which is relatively simple to install.

In addition to the numerous above described objects and advantages of the present invention, various other objects and advantages of the weldable cast insert will become more readily apparent to those persons who are skilled in the shipping container fastening art from the following more detailed description of the invention, particularly, when such description is taken in conjunction with the attached drawings and the appended claims.

BRIEF DESCRIPTION OF THE VARIOUS EMBODIMENTS OF THE INVENTION

Prior to proceeding to the more detailed description of the present invention, it should be noted that, for the sake of clarity, identical components having identical functions have been designated with identical reference numerals throughout the several views illustrated in the drawings.

Although the weldable cast insert, according to the present invention, will be described in conjunction with use on a flat bottom type railway car, it should be understood that it is not limited thereto, for example, the apparatus could be used in conjunction with a flat bed truck or ocean going cargo vessels, etc.

Figure 5:
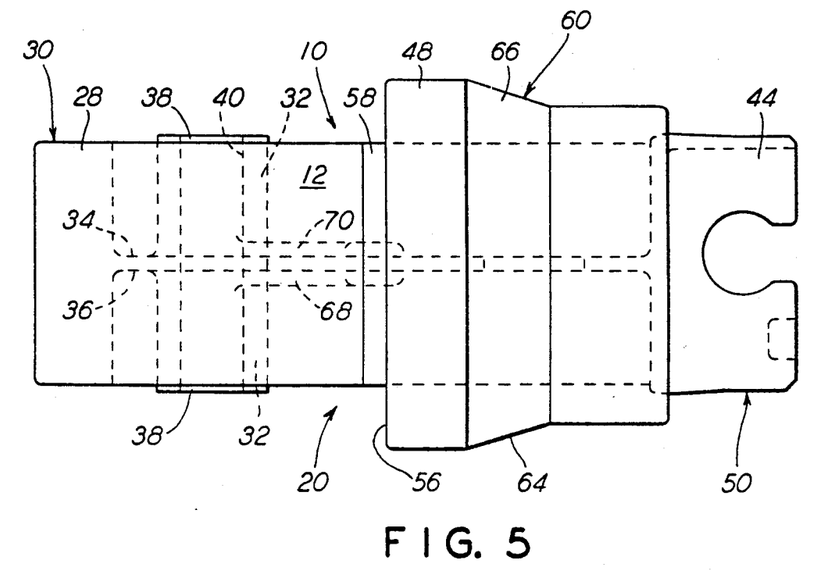
FIG. 5 is a top view of a support pedestal for a shipping container having a box-like member disposed at one end thereof for receiving the weldable cast insert therein.
Figure 6:
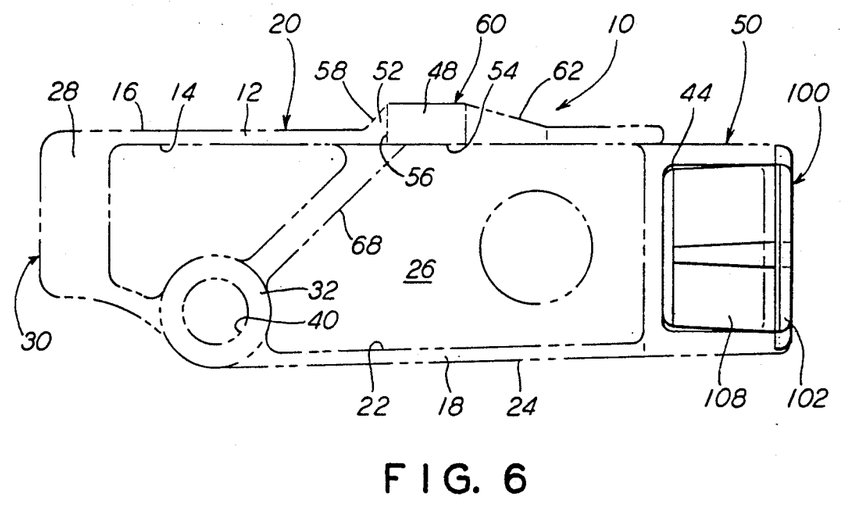
FIG. 6 is a side elevation view of the shipping container support pedestal illustrated in FIG. 5 and having the weldable cast insert installed therein.
Figure 7:
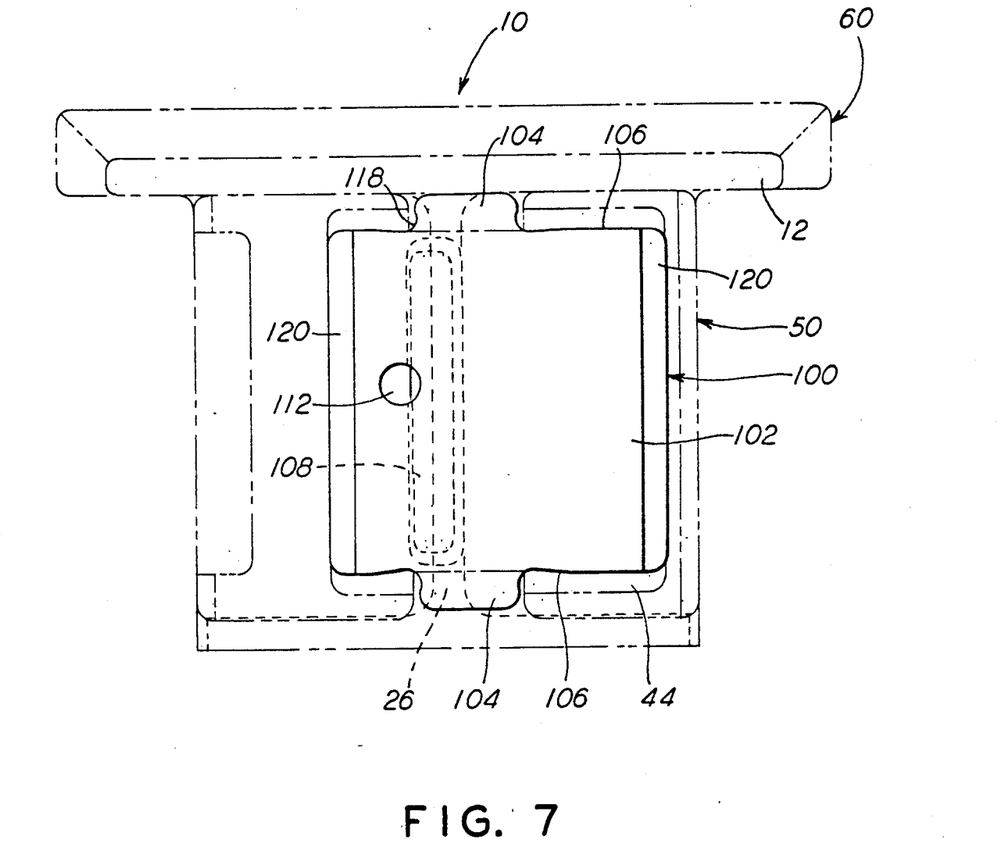
FIG. 7 is an end view of the shipping container support pedestal illustrated in FIGS. 5 and 6 which incorporates therein the weldable cast insert for use with a particular locking device presently in use in the railway industry to secure a shipping container to a flat bottom railway car.

Now refer, more particularly, to FIGS. 5–7. Illustrated therein is an apparatus, generally designated 10, which is capable of being pivotally connected to a predetermined portion of a flat bottom type railway car (not shown). Apparatus 10 is used for both supporting and connecting of a cargo shipping container (not shown) on and to, respectively, such railway car.

The apparatus 10 is taught and claimed in a co-pending application filed on Jan. 18, 1991 and having Ser. No. 07/638,684, which is assigned to the assignee of the present invention.

The apparatus 10 includes an elongated body member, generally designated 20, having each of a predetermined length and a predetermined width and a predetermined height. Such body member 20 has a first substantially flat and generally rectangular plate-like portion 12 having axially-opposed inner and outer surfaces 14 and 16 respectively. The elongated body member 20 further has a second substantially flat and generally rectangular plate-like portion 18 having axially-opposed inner and outer surfaces 22 and 24 respectively. There is a connecting wall portion 26 disposed along a length of the inner surface 14 of such first plate-like portion 12 as well as the inner surface 22 of such second plate-like portion 18. The connecting wall portion 26 is connected to the inner surface 14 of the first plate-like portion 12 and to the inner surface 22 of the second plate-like portion 18 substantially midway between the outer longitudinal edges thereof.

The apparatus 10 further includes a counterweight means, generally designated 30. Such counterweight means 30 is connected to a first predetermined end of the elongated body member 20 for providing a predetermined force that will be required to effect pivoting of the apparatus 10 from such first inoperable shipping container connection position into a second operable shipping container connection position. In a presently preferred embodiment of the invention, although not limited thereto, such counterweight means 30 will preferably be a thickened wall section 28. The predetermined force required to pivot such apparatus 10 provided by such counterweight means 30 connected to such first end of the elongated body member 20 will generally be less than about 65 pounds.

Additionally, the apparatus 10 includes a pair of pin bosses 32. Such pin bosses 32 are disposed in an axially aligned position and are connected to opposed surfaces 34 and 36 of such connecting wall portion 26 of the elongated body member 20. Such pair of pin bosses 32 are located closely adjacent the first end of such elongated body member 20 and extend outwardly from the respective surfaces 34 and 36 of the connecting wall portion 26 for a predetermined length. It should be noted that in a presently preferred form of the invention, such pair of pin bosses 32 will have a generally circular configuration. Furthermore, in the presently preferred embodiment of the invention, at least a portion of each of the pair of pin bosses 32 will have a machined surface 38. Such machined surface 38 on the pair of pin bosses 32 being disposed at the outer most end thereof. An aperture 40, having a predetermined diameter, is formed through such pair of pin bosses 32 and a portion of the connecting wall portion 26 disposed between such pair of pin bosses 32. The aperture 40 receives therein a pivot pin (not shown) which pivotally connects such apparatus 10 to the bed portion of the railway car.

Apparatus 10 has a box-like member, generally designated 50, connected to an axially-opposed second end of such elongated body member 20. A cavity 44 is formed in the box-like member 50 and receives therein a T-shaped member, generally designated 100, produced according to the instant invention, that is adapted to be connectable to a particular style locking device (not shown) capable of securing such shipping container to such apparatus 10. The cavity 44 preferably is generally rectangular in shape.

In the present invention, as best seen in FIGS. 1–4, engageable with and securable in the cavity 44 formed in such box-like member 50 disposed at one end of the shipping container support pedestal 10, is a weldable cast insert, generally designated 100. Such cast insert 100 enables a predetermined style locking mechanism (not shown) to be used in securing a cargo shipping container to the support pedestal 10. The locking mechanism, referred to above, is manufactured by the Holland Corporation and is in widespread use in the railroad industry, for example. The weldable cast insert 100 includes a substantially flat and generally rectangular plate-like portion 102. Plate-like portion 102 has each of a predetermined width, a predetermined length, a predetermined thickness, axially opposed surfaces and a pair of axially opposed outer edges.

At least one lug-like portion 104 extends outwardly for a predetermined distance from a predetermined outer edge 106 of a first of such pair of axially opposed outer edges of such plate-like portion 102. Such lug-like portion 104 is located intermediate each end of such outer edge 106. The lug-like portion 102 is engageable with a slot formed adjacent an outer edge of at least one wall portion of a pair of axially opposed wall portions of such cavity 44 formed in the box-like member 50. The lug-like portion 104 provides enhanced securement capability of the weldable cast insert 100 to the box-like member 50.

The weldable cast insert 100 further includes at least one leg portion 108 which depends from a first predetermined surface 110 of such axially opposed surfaces of the plate-like portion 102. Such leg portion 108 extends from the first predetermined surface 110 for a predetermined length and such at least one leg portion 108 has a predetermined configuration.

There is at least one aperture 112 having a predetermined configuration formed through a predetermined portion of the plate-like portion 102.

Finally, the weldable cast insert 100 has at least one cut-out portion 114 formed in such at least one leg portion 108 adjacent a predetermined surface 116 thereof. The cut out portion 114 is in substantial axial alignment with the at least one aperture 112. Such at least one cut-out portion 114 also includes a predetermined configuration. The predetermined configuration of the at least one cut-out portion 114 and the at least one aperture 112 are such that they facilitate use of the particular locking mechanism discussed above.

In a more preferred embodiment of the present invention the weldable cast insert 100 includes a pair of lug-like portions 104 which extend outwardly for such predetermined distance from each outer edge 106 of such first of such pair of axially opposed outer edges on the plate-like portion 102.

Figures 1, 2, 3, 4:
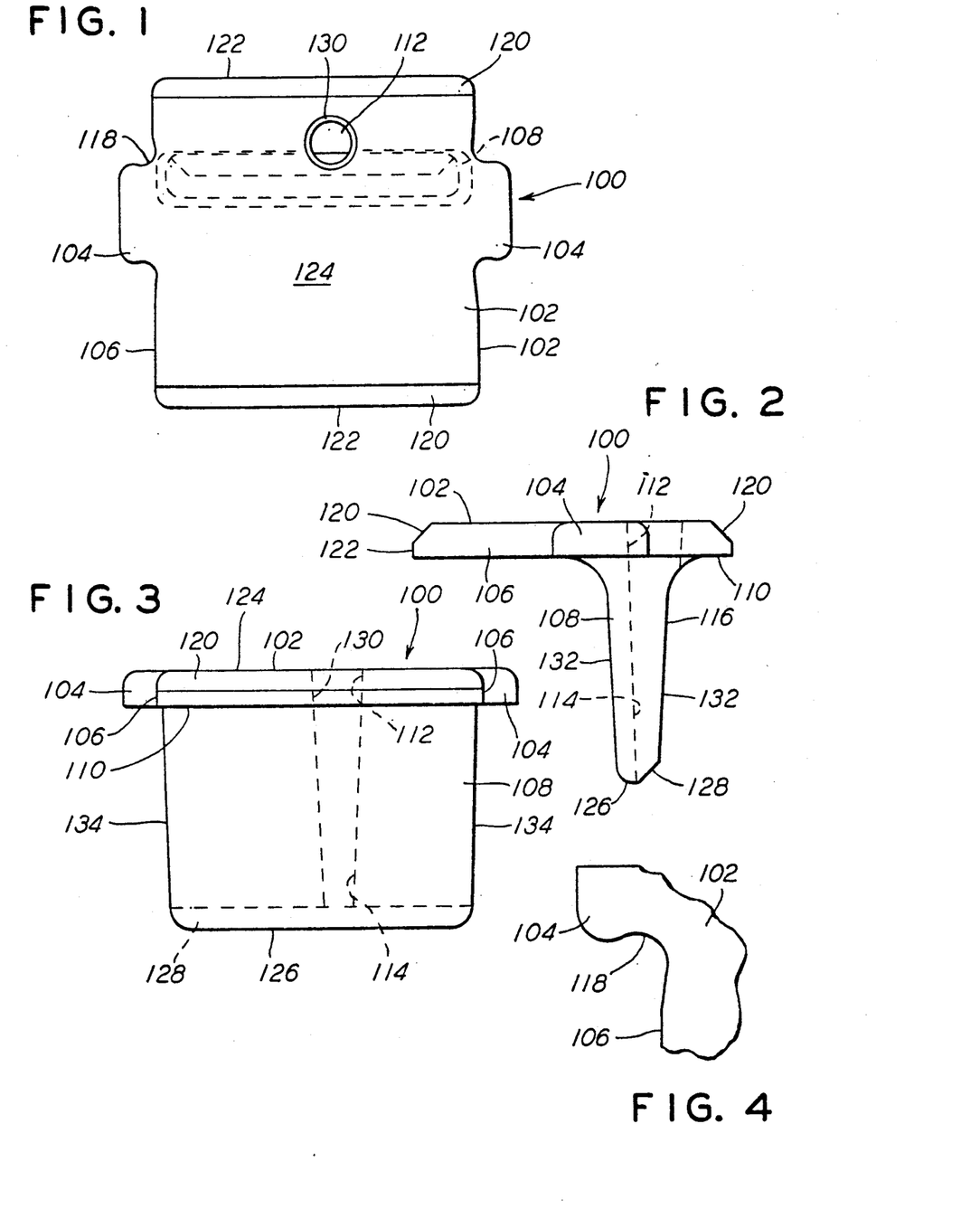
FIG. 1 is a top view of a presently preferred embodiment of the weldable cast insert according to the present invention.
FIG. 2 is a side elevation view of the weldable cast insert illustrated in FIG. 1.
FIG. 3 is an end view of the weldable cast insert illustrated in FIGS. 1 and 2.
FIG. 4 is an enlarged view showing a recessed portion where a lug member is connected to an outer edge of a plate-like portion of such weldable cast insert.

Additionally, the weldable cast insert 100 in the presently preferred embodiment of the invention will further include an arcuately shaped recess portion 118 adjacent each corner formed where such pair of lug-like portions 108 joins such first of such pair of axially opposed outer edges 106 in the plate-like portion 102.

In the embodiment of the invention presently being described, the plate-like portion 102 also includes a beveled portion 120 formed adjacent a second of such pair of axially opposed outer edges 122 and a second axially opposed surface 124 of such plate-like portion 102. Beveled portion 120 facilitates securement of the weldable cast insert 100 in the cavity 44 of the box-like member 50. Such beveled portions 120 preferably will have a taper of between about 40 degrees and about 50 degrees.

Further, in the presently preferred embodiment of the invention, the at least one leg portion 108 adjacent one edge 126 disposed substantially parallel to the first predetermined surface 110 of the plate-like portion 102 will include a beveled portion 128 formed thereon. Beveled portion 128 is disposed adjacent the predetermined surface 116 of such at least one leg portion having the cut-out portion 114 formed therein. The beveled portion 128 formed on the leg portion 108 has a taper preferably between about 40 degrees and about 50 degrees.

According to a presently preferred embodiment of the present invention, the predetermined configuration of such at least one aperture 112 formed through such predetermined portion of the plate-like portion 102 will normally be round. Such generally round aperture 112 will include a tapered wall portion 130 formed by such aperture 112 having a first smaller diameter adjacent a first predetermined surface 110 of the axially-opposed surface of the plate-like portion 102 and a second larger diameter adjacent such second surface of such axially-opposed surfaces of the plate-like portion 102. The first smaller diameter of such aperture 112 will preferably be between about 0.725 inch and about 0.775 inch and the second larger diameter of such aperture 112 will preferably be between about 0.915 inch and about 0.965 inch.

In this presently preferred embodiment of the invention, the predetermined configuration of such at least one cut-out portion 114 formed in such at least one leg portion 108 will generally be arcuately shaped.

Further, the at least one leg portion 108 includes a predetermined taper of each substantially flat surface portion 132 as well as a predetermined taper of each outer edge portion 134. Each outer edge portion 134 of the at least one leg portion 108 starts at a position inwardly from a respective outer edge of such first of such pair of axially-opposed outer edges of the plate-like portion 102. The predetermined taper of such each of such substantially flat surface portion 132 preferably will be between about 2.75 degrees and about 3.25 degrees and the predetermined taper of such each of such outer edge portions 134 will preferably be between about 1.25 degrees and about 1.75 degrees. Further, each such outer edge portion 134 of the at least one leg portion 108 will start at a position inwardly from a respective outer edge of such first of such pair of axially-opposed outer edges of the plate-like portion 102 at a distance of between about 0.078 inch and about 0.102 inch. Finally, the predetermined distance of such at least one lug-like portion 104 extends outwardly from such predetermined outer edge 106 will be between about 0.55 inch and about 0.69 inch.

Finally, the apparatus 10 includes a support member, generally designated 60, that is secured to the outer surface 16 of such first plate-like portion 12. Support member 60 begins a first predetermined distance from the first end of such elongated body member 20 and extends slightly beyond such axially-opposed second end of the elongated body member 20 for a second predetermined distance. Such support member 60 has a predetermined configuration which at least includes a first portion 48 which extends outwardly from each outer longitudinal edge of such first plate-like portion 12 and a second portion 52 which extends above such outer surface 16 of the first plate-like portion 12. This first portion 48 of the support member 60 includes a first substantially flat surface 54 which is engageable with an upper surface of a bed (not shown) of such railway car when the apparatus 10 is in such inoperable shipping container securing position and a second substantially flat surface 56 which faces the first end of such elongated body member 20. Such second flat surface 56 being engageable with such bed of the railway car when the apparatus 10 is in such operable shipping container securing position. The second portion 52 of such support member 60 includes a flat tapered surface 58 which faces the first end of such elongated body member 20. In the presently preferred embodiment of the invention, support member 60 includes at least four tapered surfaces 58, 62, 64 and 66. It is also preferred that each of the first flat surface 54 and the second flat surface 56 disposed on such support member 60 will be machined surfaces.

It is of importance to note that a plane extending across the outermost end of the box-like member 50 and a plane extending across the second flat surface 56 of the support member 60 are substantially parallel to one another.

According to a more preferred alternative embodiment of the apparatus 10, such elongated body member 20 will further include a reinforcing rib 68 adjacent a first surface 34 of such connecting wall portion 26. Such reinforcing rib 68 extends between a portion of the pin bosses 32 and a portion of the inner surface 14 of such first plate-like member 12. Such reinforcing rib 68 having a predetermined configuration. That portion of such pin bosses 32 from which such reinforcing rib 68 extends is such that a first end of a substantially longitudinally disposed midpoint of the reinforcing rib 68 will intersect a longitudinally disposed geometric center line of such pin bosses 32 at a predetermined angle. Such predetermined angle being measured from a horizontally disposed plane which intersects such geometric center of the pin bosses 32 when such apparatus 10 is in the above mentioned inoperable shipping container connecting position. Additionally, that portion of such inner surface 14 of the first plate-like member 12 where the reinforcing rib 68 abuts is such that a second end of such longitudinally disposed midpoint of the reinforcing rib 68 intersects a plane formed by an intersection of a plane extending from the first flat surface 54 of such first portion 48 of the support member 60 and a plane extending from such second flat surface 56 of such first portion 48 of the support member 60. In the most preferred embodiment of the invention, the elongated body member 20 further includes a mirror image reinforcing rib 70 disposed adjacent a second axially-opposed surface 36 of such connecting wall portion 26.

Further, according to the presently preferred embodiment of the apparatus 10, the elongated body member 20, the counter weight means 30, the pair of pin bosses 32, the aperture 40, such box-like member 50 and the support member 60 will be formed as an integral single piece casting. In addition, reinforcing ribs 68 and 70 will be formed at the same time thereby eliminating the requirement of costly welding of the components in order to assemble such apparatus 10.

While a number of presently preferred and alternative embodiments of the present invention had been both illustrated in the drawings and described in detail above, it should be noted that various other modifications and adaptations of the weldable cast insert for use in supporting and connecting a cargo shipping container on and to, respectively a transportation vehicle can be made by those persons who are skilled in the container fastening art without departing from the spirit of the scope of the appended claims.

I claim:

1. A weldable cast insert engageable with and securable in a cavity formed in a box-like member disposed at one end of a shipping container support pedestal which is pivotally connectable to a flat bottom-type transportation vehicle, said cast insert enabling a predetermined style locking mechanism to be used to secure a cargo shipping container to such support pedestal, said weldable cast insert comprising:
    (a) a substantially flat and generally rectangular plate-like portion having each of a predetermined width, a predetermined length, a predetermined thickness, axially-opposed surfaces and a pair of axially-opposed outer edges;
    (b) at least one lug-like portion extending outwardly a predetermined distance from a predetermined outer edge of a first of said pair of axially-opposed outer edges of said plate-like portion intermediate each end thereof, said at least one lug-like portion being engageable with a slot formed adjacent an outer edge of at least one wall portion of a pair of axially-opposed wall portions of such cavity formed in such box-like member thereby providing enhanced securement capability of said cast insert to such box-like member;
    (c) at least one leg portion depending from a first predetermined surface of said axially-opposed surfaces of said plate-like portion and extending from said first predetermined surface for a predetermined length, said at least one leg portion having a predetermined configuration;
    (d) at least one aperture having a predetermined configuration formed through a predetermined portion of said plate-like portion; and
    (e) at least one cut-out portion formed in said at least one leg portion adjacent a predetermined surface thereof and substantially in axial alignment with said at least one aperture, said at least one cut-out portion having a predetermined configuration.

2. A weldable cast insert, according to claim 1, wherein said cast insert includes a pair of lug-like portions extending outwardly for said predetermined distance from each outer edge of said first of said pair of axially-opposed outer edges on said plate-like portion.

3. A weldable cast insert, according to claim 2, wherein said cast insert further includes an arcuately shaped recessed portion adjacent each corner formed where said pair of lug-like portions joins said first of said pair of axially-opposed outer edges on said plate-like portion.

4. A weldable cast insert, according to claim 3, wherein said plate-like portion includes a beveled portion having a taper of between about 40.0 degrees and about 50.0 degrees formed adjacent a second of said pair of axially-opposed outer edges and a second axially-opposed surface of said plate-like portion.

5. A weldable cast insert, according to claim 4, wherein said at least one leg portion adjacent one edge disposed substantially parallel to said first predetermined surface of said plate-like portion includes a beveled portion having a taper of between about 44.0 degrees and about 46.0 degrees formed thereon adjacent said predetermined surface of said at least one leg portion having said cut-out portion formed therein.

6. A weldable cast insert, according to claim 3, wherein said at least one leg portion adjacent one edge disposed substantially parallel to said first predetermined surface of said plate-like portion includes a beveled portion having a taper of between about 40.0 degrees and about 50.0 degrees formed thereon adjacent said predetermined surface of said at least one leg portion having said cut-out portion formed therein.

7. A weldable cast insert, according to claim 6, wherein said predetermined configuration of said at least one aperture formed through said predetermined portion of said plate-like portion is generally round and includes a tapered wall portion formed by said at least one aperture having a first smaller diameter of between about 0.725 inch and about 0.775 inch adjacent said first predetermined surface of said axially-opposed surfaces of said plate-like portion and a second larger diameter of between about 0.915 inch and about 0.965 inch adjacent said second of said axially-opposed surfaces of said plate-like portion.

8. A weldable cast insert, according to claim 3, wherein said predetermined configuration of said at least one aperture formed through said predetermined portion of said plate-like portion is generally round and includes a tapered wall portion formed by said at least one aperture having a first smaller diameter adjacent said first predetermined surface of said axially-opposed surface of said plate-like portion and a second larger diameter adjacent said second of said axially-opposed surfaces of said plate-like portion.

9. A weldable cast insert, according to claim 1, wherein said plate-like portion includes a beveled portion formed adjacent a second of said pair of axially-opposed outer edges and a second axially-opposed surface of said plate-like portion.

10. A weldable cast insert, according to claim 1, wherein said at least one leg portion adjacent one edge disposed substantially parallel to said first predetermined surface of said plate-like portion includes a beveled portion formed thereon adjacent said predetermined surface of said at least one leg portion having said cut-out portion formed therein.

11. A weldable cast insert, according to claim 1, wherein said predetermined configuration of said at least one aperture formed through said predetermined portion of said plate-like portion is generally round.

12. A weldable cast insert, according to claim 11, wherein said generally round said at least one aperture includes a tapered wall portion formed by said at least one aperture having a first smaller diameter adjacent said first predetermined surface of said axially-opposed surface of said plate-like portion and a second larger diameter adjacent said second of said axially-opposed surfaces of said plate-like portion.

13. A weldable cast insert, according to claim 1, wherein said predetermined configuration of said at least one cut-out portion formed in said at least one leg portion is arcuately shaped.

14. A weldable cast insert, according to claim 1, wherein said predetermined configuration of said at least one leg portion includes, a predetermined taper of each substantially flat surface portion.

15. A weldable cast insert, according to claim 14, wherein said predetermined configuration of said at least one leg portion includes a predetermined taper of each outer edge portion.

16. A weldable cast insert, according to claim 15, wherein said each said outer edge portion of said at least one leg portion starts at a position inwardly from a respective outer edge of said first of said pair of axially-opposed outer edges of said plate-like portion.

17. A weldable cast insert, according to claim 16, wherein said predetermined taper of said each of said substantially flat surface portion is generally between about 2.75 degrees and about 3.25 degrees.

18. A weldable cast insert, according to claim 17, wherein said predetermined taper of said each of said outer edge portion is generally between about 1.25 degrees and about 1.75 degrees.

19. A weldable cast insert, according to claim 18, wherein said each said outer edge portion of said at least one leg portion starts at a position inwardly from a respective outer edge of said first of said pair of axially-opposed outer edges of said plate-like portion at a distance of between about 0.078 inch and about 0.102 inch.

20. A weldable cast insert, according to claim 1, wherein said predetermined distance said at least one lug-like portion extends outwardly from said predetermined outer edge of said first of said pair of axially-opposed edges of said plate-like portion is between about 0.55 inch and about 0.69 inch.

* * * * *

UNITED STATES PATENT AND TRADEMARK OFFICE
CERTIFICATE OF CORRECTION

PATENT NO. : 5,156,505
DATED : October 20, 1992
INVENTOR(S) : Peter Scott Mautino It is certified that error appears in the above-identified patent and that said Letters Patent is hereby corrected as shown below:

Column 2, line 29, delete "&:he" and insert --the--.

Column 6, line 51, delete "1!0" and insert --110--.

Column 11, line 11, delete ","

Signed and Sealed this

Twenty-sixth Day of October, 1993

Attest:

BRUCE LEHMAN

Attesting Officer     Commissioner of Patents and Trademarks